(12) United States Patent
Ellis et al.

(10) Patent No.: US 11,156,842 B2
(45) Date of Patent: Oct. 26, 2021

(54) HEAD-MOUNTED-DISPLAY SYSTEM INCLUDING THREE-DIMENSIONAL KNITTED LAYER

(71) Applicant: FACEBOOK TECHNOLOGIES, LLC, Menlo Park, CA (US)

(72) Inventors: Shane Michael Ellis, Bellevue, WA (US); Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 104 days.

(21) Appl. No.: 15/890,582

(22) Filed: Feb. 7, 2018

(65) Prior Publication Data

US 2019/0243145 A1 Aug. 8, 2019

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
CPC ........ G02B 27/0176; G02B 2027/0178; G02B 23/12; G02B 23/00
See application file for complete search history.

(56) References Cited

U.S. PATENT DOCUMENTS

| | | | |
|---|---|---|---|
| 5,408,086 A * | 4/1995 | Morris | G02B 23/125 250/214 VT |
| 5,796,374 A * | 8/1998 | Cone | G02B 27/0176 345/8 |
| 6,931,762 B1 | 8/2005 | Dua | |
| 7,721,737 B2 | 5/2010 | Radney | |
| 9,857,839 B1 | 1/2018 | Bristol et al. | |
| 2007/0119538 A1* | 5/2007 | Price | A42B 3/06 156/242 |
| 2010/0287687 A1* | 11/2010 | Ho | A42B 3/003 2/411 |
| 2011/0273662 A1 | 11/2011 | Hwang et al. | |

(Continued)

FOREIGN PATENT DOCUMENTS

| | | |
|---|---|---|
| CN | 205374873 U | 7/2016 |
| CN | 111712752 A | 9/2020 |
| WO | 2019/157084 A1 | 8/2019 |

OTHER PUBLICATIONS

International Search Report and Written Opinion received for PCT Application Serial No. PCT/US2019/016893 dated May 24, 2019, 8 pages.

(Continued)

*Primary Examiner* — Shaheda A Abdin
(74) *Attorney, Agent, or Firm* — FisherBroyles, LLP

(57) ABSTRACT

A head-mounted-display assembly may include a knitted layer formed of a plurality of fibers and extending in three dimensions. The knitted layer may include (1) a first region having a first degree of at least one physical property, (2) a second region having a second degree of the at least one physical property, and (3) a transition region extending between the first region and the second region. The transition region of the knitted layer may progressively change in degree of the at least one physical property proceeding from the first region toward the second region. Various other apparatuses, systems, and methods are also disclosed.

19 Claims, 11 Drawing Sheets

(56) References Cited

U.S. PATENT DOCUMENTS

| | | |
|---|---|---|
| 2012/0255201 A1 | 10/2012 | Little |
| 2016/0051402 A1 | 2/2016 | Laghi et al. |
| 2016/0299346 A1 | 10/2016 | Allin et al. |
| 2017/0173262 A1* | 6/2017 | Veltz .................. A61M 5/1723 |
| 2017/0242262 A1 | 8/2017 | Fuchs et al. |

OTHER PUBLICATIONS

International Preliminary Report on Patentability received for PCT Application Serial No. PCT/US2019/016893 dated Aug. 20, 2020, 7 pages.

Partial Supplementary European Search Report received for EP Patent Application Serial No. 19751578.6 dated Feb. 10, 2021, 23 pages.

* cited by examiner

HEAD-MOUNTED-DISPLAY SYSTEM INCLUDING THREE-DIMENSIONAL KNITTED LAYER

BACKGROUND

Virtual reality and augmented reality headsets are widely gaining in popularity for use in a growing number of activities. Such headsets may integrate visual information into a user's field of view to enhance their surroundings or allow them to step into realistic three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

However, substantial electronics and optical systems are often required to deliver immersive, high-definition images to users. Such components may add significant weight to virtual reality and augmented reality headsets, presenting difficulties in securely and comfortably mounting such headsets to users' heads. Strap systems, which are commonly used to fasten headsets to users' heads, may be uncomfortable to users and may provide an inadequate degree of adjustability. Additionally, headset housings may also add to the weight of the headsets and may allow for only limited adjustment to accommodate users' unique facial features. Improving the comfort level and adjustability of virtual reality and augmented reality headsets may require the addition of various parts that increase the complexity, cost, and weight of the headsets while diminishing their aesthetic appearance.

SUMMARY

As will be described in greater detail below, the instant disclosure describes various head-mounted-display apparatuses, assemblies, and systems including three-dimensional knitted layers and methods for manufacturing the same. In one example, a head-mounted-display assembly may include a knitted layer formed of a plurality of fibers and extending in three dimensions. The knitted layer may include (1) a first region having a first degree of at least one physical property, (2) a second region having a second degree of the at least one physical property, and (3) a transition region extending between the first region and the second region. The transition region of the knitted layer may progressively change in degree of the at least one physical property proceeding from the first region toward the second region.

According to some embodiments, the at least one physical property may include at least one of rigidity, elasticity, flexibility, deformability, or bondability to at least one specified material. In some examples, the plurality of fibers may include a plurality of yarns, each of the plurality of yarns including multiple fibers. In at least one example, the knitted layer may include at least a portion of a display housing for mounting at least one head-mounted-display component. In various examples, the knitted layer may include at least a portion of at least one of a front-facing portion or a side portion of the display housing. The side portion of the display housing may extend from the front-facing portion toward a viewing opening dimensioned to surround at least a portion of a user's face. In this example, the first region of the knitted layer may include a mounting region for mounting the at least one head-mounted-display component. The first region of the knitted layer may have a higher degree of rigidity than the second region of the knitted layer. The knitted layer may include at least a portion of a strap subsystem dimensioned to extend around at least a portion of a user's head.

According to at least one embodiment, the plurality of fibers may include a first type of fiber and a second type of fiber that includes a different material than the first type of fiber. In this example, at least one of the first type of fiber and the second type of fiber may include at least one of a thermoplastic material, a thermosetting material, or a curable material. Additionally or alternatively, the first region of the knitted layer may include a first proportion of the first type of fiber to the second type of fiber, and the second region of the knitted layer may include a second proportion of the first type of fiber to the second type of fiber. In this example, the second proportion may differ from the first proportion. In some embodiments, the first region may have a first average layer thickness and the second region may have a second average layer thickness that differs from the first average layer thickness. In various embodiments, at least a portion of an electrical circuit may be disposed in the knitted layer.

In some embodiments, a head-mounted-display system may include a knitted layer formed of a plurality of fibers and extending in three dimensions. The knitted layer may include (1) a first region having a first degree of at least one physical property, and (2) a second region having a second degree of the at least one physical property. At least one electronic component may be mounted to the first region of the knitted layer. According to some examples, the at least one electronic component may be mounted to the first region of the knitted layer by at least one of bonding or mechanical fastening. In various examples, the first region of the knitted layer may have a higher degree of rigidity than the second region of the knitted layer.

A corresponding method may include (1) knitting together a plurality of fibers to form a knitted layer of a head-mounted-display assembly, the knitted layer extending in three dimensions. The knitted layer may include at least two regions which, when processed, cause (1) a first region to have a first degree of at least one physical property and (2) a second region to have a second degree of the at least one physical property. A transition region may extend from the first region to the second region and may progressively change in degree of the at least one physical property proceeding from the first region toward the second region.

According to some embodiments, during processing, at least a portion of the knitted layer may be exposed to at least one of elevated heat, elevated pressure, light, radiation, or at least one chemical agent sufficient to modify the at least one physical property of at least the portion of the knitted layer. Additionally or alternatively, during processing, at least a portion of the knitted layer may be at least one of softened, melted, cured, or molded. In at least one example, the first region of the processed knitted layer may be configured to have at least one head-mounted-display component mounted thereto. In some examples, the at least one head-mounted-display component may be mounted to the first region of the processed knitted layer by at least one of bonding or mechanically fastening the at least one head-mounted-display component to the first region of the processed knitted layer. In some embodiments, the first region of the knitted layer may include a first proportion of a first type of fiber to a second type of fiber. Additionally or alternatively, the second region of the knitted layer may include a second proportion of the first type of fiber to the second type of fiber. In this example, the second proportion may differ from the first proportion.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
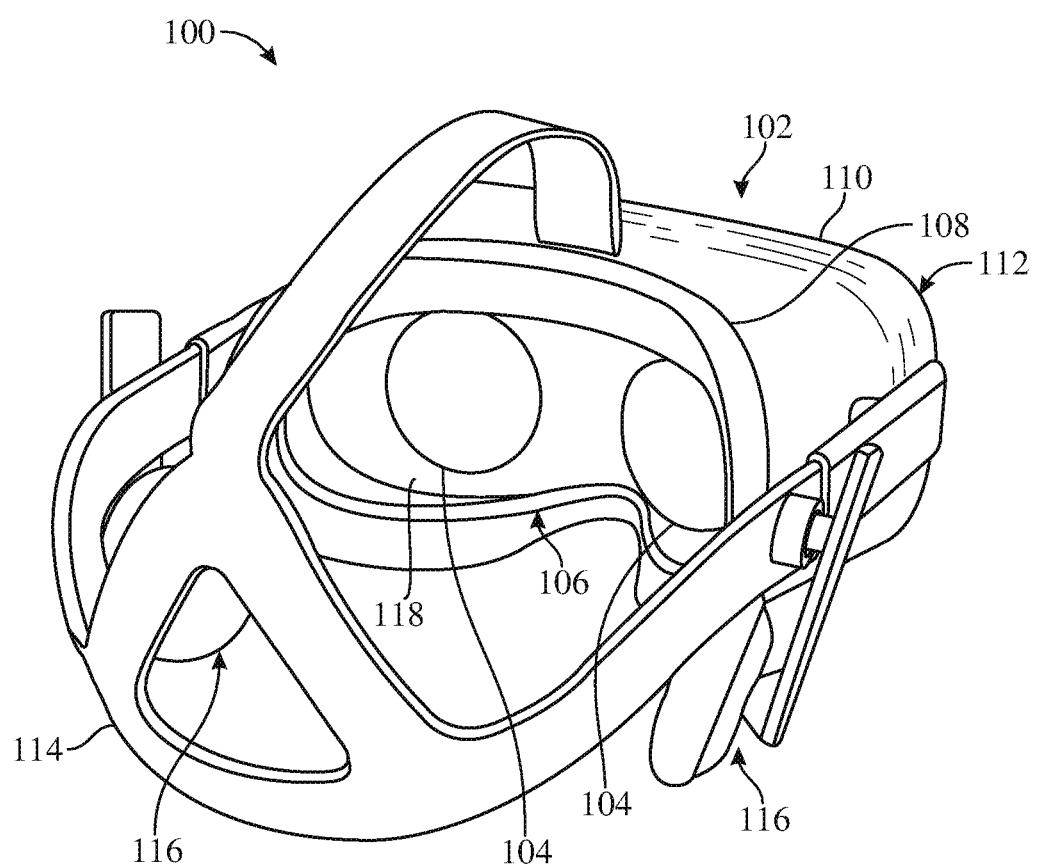
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to head-mounted-display systems including three-dimensional knitted layers. As will be explained in greater detail below, embodiments of the instant disclosure may include a knitted layer formed of a plurality of fibers and extending in three dimensions. Such a knitted layer may be included in at least a portion of a display housing and/or strap subsystem of a head-mounted-display system. The knitted layer may include different regions having different degrees of one or more physical properties (e.g., rigidity, elasticity, flexibility, or deformability, bondability to at least one specified material, etc.). For example, the knitted layer may include a first region having a first degree of at least one physical property and a second region having a second degree of the at least one physical property. The knitted layer may also include a transition region extending between the first region and the second region. The transition region may progressively change in degree of the at least one physical property proceeding from the first region toward the second region.

Such knitted layers may allow for head-mounted-display systems to be constructed with greater customizability and freedom of design. Different portions of a knitted layer may have distinct characteristics, enabling parts of a head-mounted-display system that are conventionally assembled from multiple pieces to be formed from a single seamless piece. The knitted layers may allow for an increased range of physical properties to be included in various regions of the head-mounted-display systems. For example, a display housing and/or a strap subsystem may be formed from a continuous knitted layer having various rigid sections, semi-rigid sections, flexible sections, and/or elastic sections, eliminating the need for assembling separate pieces having these respective characteristics. Such continuous knitted layers may have structurally supportive regions as well as adaptive regions that conform to a user's unique head and facial features, increasing a user's comfort level while wearing the head-mounted-display system. The knitted layers may also reduce the weight of head-mounted-display systems along with reductions in raw material requirements, assembly time, and production costs. Additionally, the aesthetic appeal of head-mounted-display systems incorporating seamless knitted layers may be improved through the elimination of bulky components and/or visible junctions between various components of the systems.

The following will provide, with reference to FIGS. 1-14, detailed descriptions of exemplary head-mounted-display systems, devices, and associated components that include three-dimensional knitted layers. Additionally, the discussion corresponding to FIG. 15 will provide examples of methods for producing head-mounted-display systems that include three-dimensional knitted layers.

FIG. 1 is a perspective view of a head-mounted-display system 100 in accordance with some embodiments. In some embodiments, head-mounted-display system 100 may include a head-mounted-display device 102, a strap subsystem 114, and audio subsystems 116. Head-mounted-display device 102 may include any type or form of display device or system that is worn on or about a user's head and displays visual content to the user. Head-mounted-display device 102 may display content in any suitable manner, including via a screen (e.g., a liquid crystal display (LCD) or a light-emitting diode (LED) screen), a projector, a cathode ray tube, an optical mixer, etc. Head-mounted-display device 102 may display content in one or more of various media formats. For example, head-mounted-display device 102 may display videos, photos, and/or computer-generated imagery (CGI). Head-mounted-display device 102 may include a display housing 110 surrounding components of head-mounted-display device 102, including lenses 104 and various structural, mechanical, and electronic components, including display components as described herein. Display housing 110 may define an opening surrounding a viewing region 106 configured to surround a portion of a user's face and field of view. Additionally, display housing 110 may include a front-facing portion 112 disposed away from viewing region 106 and side surfaces extending from front-facing portion 112 and surrounding the internal components of head-mounted-display device 102.

Head-mounted-display devices may provide diverse and distinctive user experiences. Some head-mounted-display devices may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, audio subsystems 116 may be integrated with head-mounted-display device 102 and may provide audio signals to the user's ears via audio headsets in conjunction with or separate from displayed content. Head-mounted-display system 100 may, for example, have two audio subsystems 116 located on the left and right sides of head-mounted-display system 100 to provide audio signals to the user's left and right ears, as shown in FIG. 1.

Strap subsystem 114 may be used for adjustably mounting head-mounted-display device 102 on the user's head. As shown in FIG. 1, strap subsystem 114 may include lower straps and/or an upper strap that are coupled to head-mounted-display device 102 to adjustably conform to the top and/or sides of the user's head when the user is wearing head-mounted-display system 100, as will be described in greater detail below. In some embodiments, strap assembly 114 may include a back piece coupled with the upper strap and lower straps to rest against the back of the user's head (e.g., around the user's occipital lobe). In at least one embodiment, the back piece may include an opening that is dimensioned and positioned to securely fit around a back portion (e.g., a portion of the user's occipital lobe) of the user's head.

In some embodiments, facial interface 108 may be configured to comfortably rest against a region of the user's face, including a region surrounding the user's eyes, when head-mounted-display system 100 is worn by the user. In these embodiments, facial interface 108 may include a cushion member and/or a cushioned region that is configured to rest against portions of the user's face (e.g., at least a portion of the user's nasal, cheek, temple, and/or forehead facial regions). Facial interface 108 may surround viewing region 106, which includes the user's field of vision, allowing the user to look through lenses 104 of head-mounted-display device 102 without interference from outside light while the user is wearing head-mounted-display system 100.

In some embodiments, head-mounted-display device 102 may also include a light-blocking layer 118 surrounding lenses 104. Light-blocking layer 118 may, for example, extend between lenses 104 and surrounding portions of display housing 110. Light-blocking layer 118 may include, for example, a light-absorbing material (e.g., a dark polymeric and/or fabric material) that masks internal components of head-mounted-display device 102 and that prevents any outside light incidentally entering viewing region 106 (e.g., through a gap between the user's face and facial interface 108) from being reflected within viewing region 106.

Figure 2:
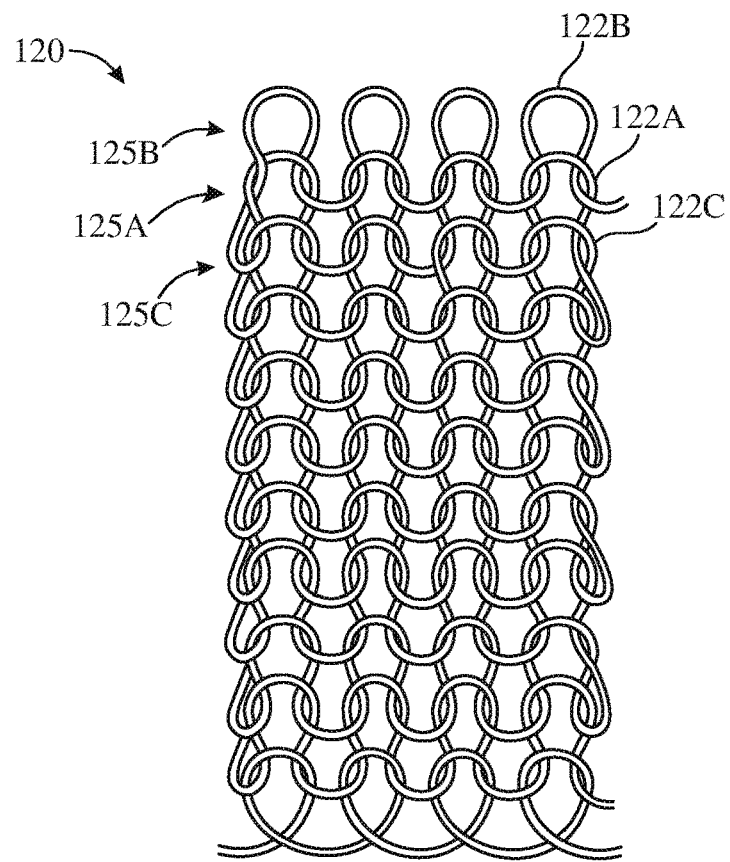
FIG. 2 is a schematic illustration of a portion of an exemplary knitted layer in accordance with some embodiments.
Figure 3:
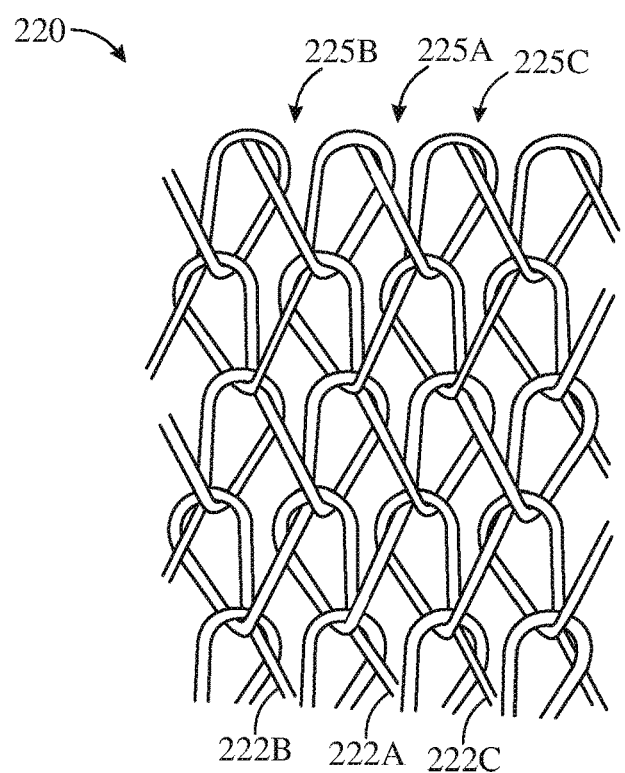
FIG. 3 is a schematic illustration of a portion of an exemplary knitted layer in accordance with some embodiments.

FIGS. 2 and 3 respectively illustrate exemplary knitting configurations that may be utilized in knitted layers for head-mounted-display systems. One or more knitting techniques may be utilized to form a knitted layer for the head-mounted-display systems described herein. FIG. 2 illustrates an exemplary portion of a knitted layer 120 formed by a weft knitting process and FIG. 3 illustrates an exemplary portion of a knitted layer 220 formed by a warp knitting process in accordance with various embodiments. Warp knitting and/or weft knitting may facilitate formation of knitted layers having a broad range of highly customizable characteristics.

As shown in FIG. 2, knitted layer 120 formed by a weft knitting technique may include at least one fiber follows a meandering path, forming a series of interlocking loops. The at least one fiber may include, for example, at least one individual fiber (e.g., a filament) and/or at least one yarn and/or thread that includes multiple fibers. Loops formed by one course of a fiber or combination of fibers (e.g., a yarn, a thread, etc.) may be interlocked with loops formed by adjacent courses of one or more fibers or combinations of fibers. For example, as illustrated in FIG. 2, loops of a first course 125A of a first fiber section 122A may be respectively interlocked with loops of a second course 125B of a second fiber section 122B and loops of a third course 125C of a third fiber section 122C. First fiber section 122A, second fiber section 122B, and third fiber section 122C may be portions of a single fiber or portions of two or more separate fibers. A portion of knitted layer 120 formed by weft knitting may include wales (i.e., sequences of stitches that are suspended from adjacent stitches) that extend in a direction that is substantially perpendicular to the direction of the fiber courses.

Knitted layer 220 formed by a warp knitting technique, as illustrated in FIG. 3, may include at least one fiber and/or thread that follows a zigzagging path, forming a series of interlocking loops. Loops formed by one course of a fiber or combination of fibers (e.g., a yarn, a thread, etc.) may be interlocked with loops formed by adjacent courses of a one or more fibers or combinations of fibers. For example, as shown in FIG. 3, loops of a first course 225A of a first fiber section 222A may be respectively interlocked with loops of a second course 225B of a second fiber section 222B and loops of a third course 225C of a third fiber section 222C. First fiber section 222A, second fiber section 222B, and third fiber section 222C may be portions of a single fiber or portions of two or more separate fibers. In contrast to knitted layer 120 formed by weft knitting, a portion of knitted layer 220 formed by warp knitting may include wales that extend in a direction that is substantially parallel to the direction of the fiber courses.

One or more knitting techniques, such as weft knitting, warp knitting, and/or any other suitable technique, may be utilized to a form knitted layers as described herein. Other techniques for knitting, weaving, and/or otherwise manipulating fibers, including, for example, yarns and/or threads formed of multiple fibers, may additionally or alternatively be utilized in the formation of knitted layers, without limitation. Such techniques may include, for example, interweaving, intertwining, twisting, and/or interlooping. Such knitting techniques may be utilized to impart various properties to particular regions of knitted layers with a high degree of specificity and granularity. Various fiber types may be incorporated into different portions of the knitted layers to customize characteristics of layer portions. Additionally, knitted layers may be further processed to physically modify selected portions of the knitted layers by, for example, hardening, melting, and/or molding certain fibers of the knitted layers.

Figure 4:
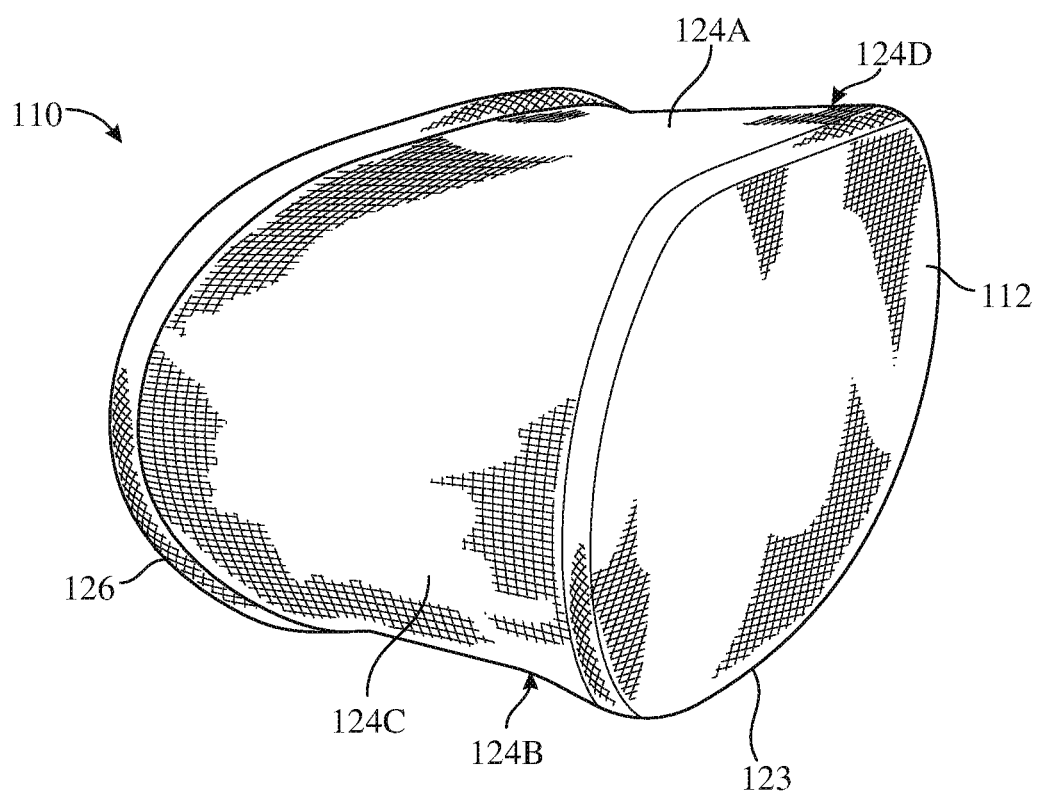
FIG. 4 is a perspective view of an exemplary display housing in accordance with some embodiments.
Figure 5:
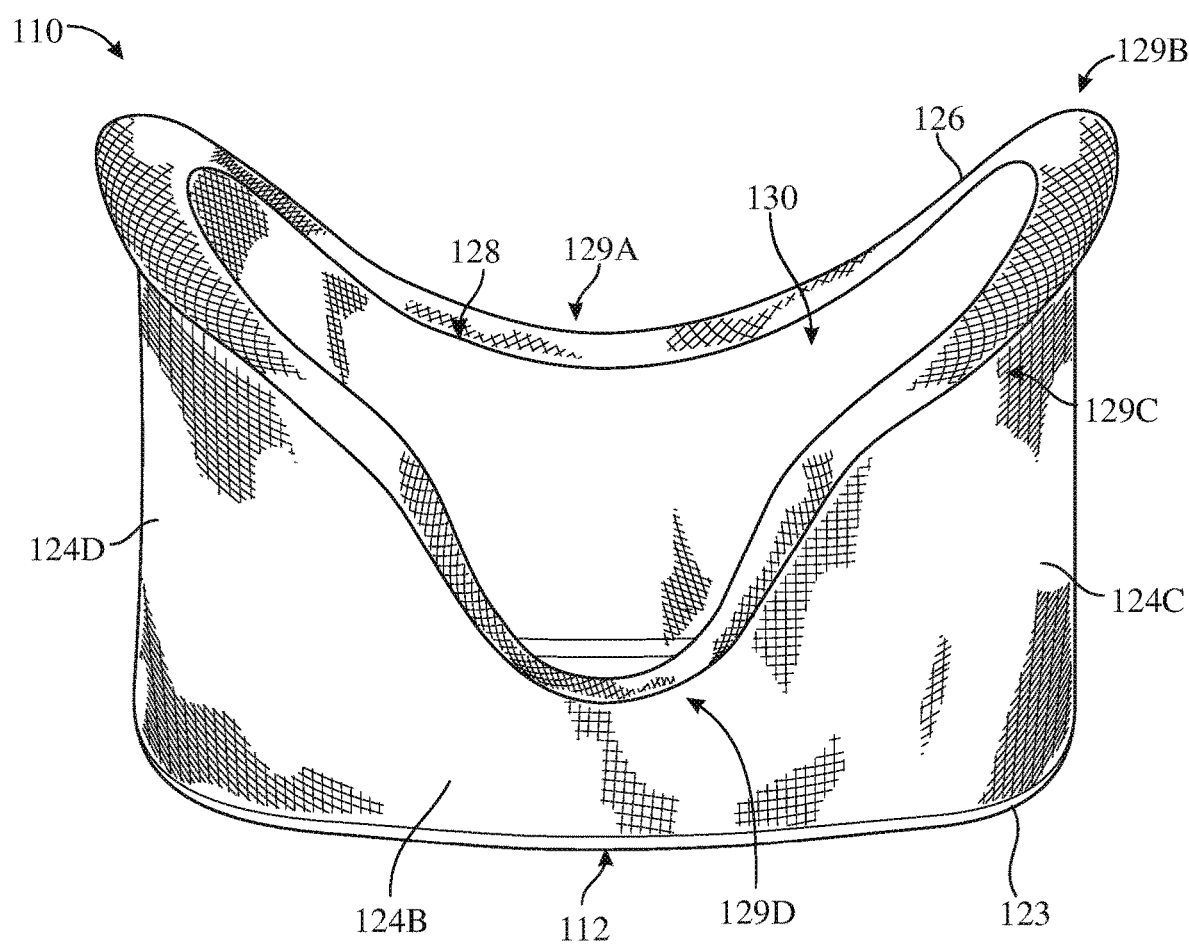
FIG. 5 is a bottom view of an exemplary display housing in accordance with some embodiments.

FIGS. 4 and 5 illustrate an exemplary display housing 110 including a knitted layer 123 according to various embodiments. At least a portion of display housing 110 may include knitted layer 123 formed by any suitable knitting technique (see, e.g., knitted layer 120 and knitted layer 220 illustrated in FIGS. 2 and 3). In some embodiments, display housing 110 may be substantially or entirely formed by knitted layer 123. While FIGS. 4 and 5 illustrate display housing 110 formed of knitted layer 123, which includes a continuous and seamless knitted layer, in some embodiments, display housing 110 may include two or more connected and/or separate knitted layers. As shown in FIGS. 4 and 5, display housing 110 may include front-facing portion 112 at a front side and a facial-interface portion 126 disposed opposite front-facing portion 112. Display housing 110 may also include at least one side portion extending between front-facing portion 112 and facial-interface portion 126. For example, display housing 110 may include an upper side portion 124A, a lower side portion 124B, a right side portion 124C, and a left side portion 124D. In some embodiments, two or more of front-facing portion 112, upper side portion 124A, lower side portion 124B, right side portion 124C, left side portion 124D, and/or facial-interface portion 126 may be portions of a seamless, integrally formed three-dimensional knitted layer.

According to at least one embodiment, a viewing opening 128 may be defined in a portion of display housing 110 disposed away from front-facing portion 112. For example, as shown in FIG. 5, viewing opening 128 may be defined by facial-interface portion 126 of display housing 110. Viewing opening 128 may extend around at least a portion of a user's face including the user's eyes such that the user's field of view is directed within display housing 110 while the user is wearing head-mounted-display system 100 (see, e.g., FIG. 1). Viewing opening 128 may be open to a housing cavity 130 defined within display housing 110. For example, housing cavity 130 may be defined within display housing 110 by front-facing portion 112, upper side portion 124A, lower side portion 124B, right side portion 124C, left side portion 124D, and/or facial-interface portion 126, as illustrated in FIG. 5. As will be described in greater detail below, housing cavity 130 may be dimensioned to house any suitable components of head-mounted-display device 102, such as image display components and corresponding electronic components. Such components may be securely mounted to suitable portions of display housing 110.

In some embodiments, one or more additional layers may be disposed on at least a portion of knitted layer 123 of display housing 110. For example, one or more other knitted layers, fabric layers, and/or coatings may be formed over at least a portion of an interior and/or an exterior surface region of knitted layer 123 of display housing 110, including, for example, at least a portion of front-facing portion 112, upper side portion 124A, lower side portion 124B, right side portion 124C, left side portion 124D, and/or facial-interface portion 126. In at least one embodiment, at least a portion of knitted layer 123 may include a light-blocking material (e.g., a light absorbing material) that prevents or inhibits light from passing through knitted layer 123 and entering housing cavity 130 of display housing 110.

Facial-interface portion 126 may form at least part of a facial-interface system that is dimensioned to abut a user's face while the user is wearing head-mounted-display system 100. In some embodiments, at least part of facial-interface portion 126 may be formed of a knitted material that is configured to directly abut and/or contact the user's face. Additionally or alternatively, a separate facial-interface cushion that is configured to abut and/or contact the user's face may be mounted to at least a part of facial-interface portion 126. For example, a facial-interface cushion including a deformable material, such as a foam material, may be mounted to facial-interface portion 126.

Facial-interface portion 126 may include various regions that are dimensioned to abut and/or be disposed in close proximity to corresponding regions of a user's face. For example, as shown in FIG. 5, facial-interface portion 126 may include a forehead region 129A corresponding to a forehead region of the user's face, temple regions 129B corresponding to temple regions of the user's face, cheek regions 129C corresponding to cheek regions of the user's face, and a nasal region 129D corresponding to a nasal region of the user's face. In some embodiments, different regions of facial-interface portion 126 may vary in shape and/or size. For example, a portion of nasal region 129D of facial-interface portion 126 may have a reduced layer thickness and/or width in comparison to other portions of facial-interface portion 126.

Figure 6:
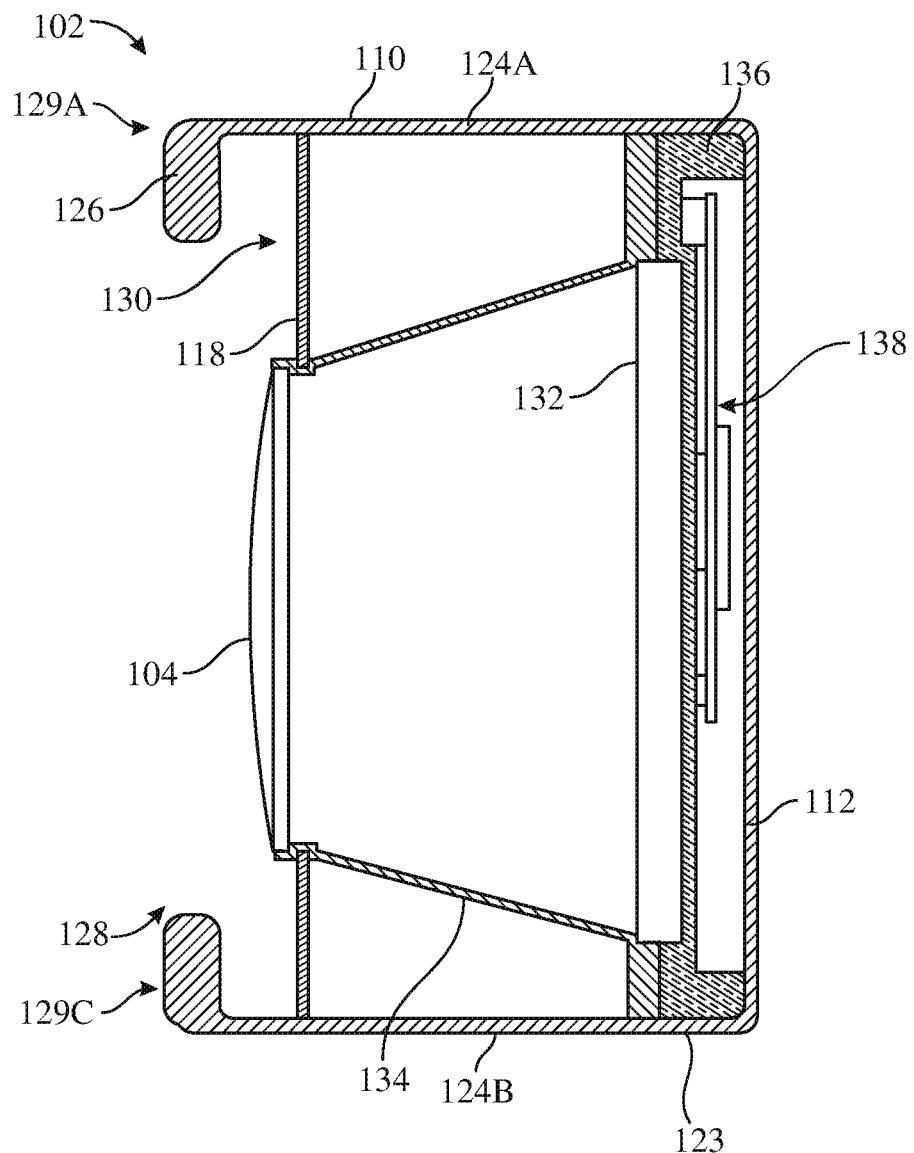
FIG. 6 is a partial cross-sectional side view of an exemplary head-mounted-display device in accordance with some embodiments.

FIG. 6 shows an exemplary partial cross-sectional side view of head-mounted-display device 102, which includes display housing 110. As shown in this figure, at least one display screen 132 may be disposed within housing cavity 130 defined in display housing 110 of head-mounted-display device 102. Display screen 132 may include any suitable type of display screen for displaying content to a user. For example, head-mounted-display device 102 may include a single display screen 132 disposed within display housing 110 so as to overlap lenses 104 such that images produced by a display region of display screen 132 are visible to a user through lenses 104. In some embodiments, distinct portions of display screen 132 may be visible to each of the user's eyes, with the screen content visible to each eye being separated by a dividing region (e.g., separate eye cups, a central partition, etc.) extending between lenses 104 and display screen 132. Such a configuration may enable distinct images to be presented by display screen 132 to each of the user's eyes, allowing for three-dimensional images to be perceived by the user. In some embodiments, head-mounted-display device 102 may include multiple display screens 132. For example, head-mounted-display device 102 may include a pair of display screens 132, with a separate one of the display screens 132 being visible to each of the user's left and right eyes.

Display screen 132 may include a plurality of pixels and sub-pixels that form visible images according to any suitable display technology. Display screen 132 may be any suitable type of display screen, such as an LCD screen (e.g., a backlit LCD screen), an LED screen (e.g., an active-matrix organic LED (AMOLED) screen), a plasma screen, an electrophoretic display screen, an electrowetting display screen, a cathode ray screen, and/or any other suitable type of image display screen. Light may be emitted from a display surface of display screen 132 such that displayed images are visible to a user. In some examples, images may be produced by driving sub-pixels of display screen 132 at different currents and/or voltages such that different amounts of light are emitted from each of the sub-pixels.

According to some embodiments, each lens 104 of head-mounted-display device 102 may be mounted to a corresponding lens fixture 134, which may extend between lens 104 and a portion of display screen 132. In some embodiments, each lens fixture 134 may surround a viewing path between the corresponding lens 104 and display screen 132. As such, image light emitted by display screen 132 may be visible to a user through lenses 104. According to at least one embodiment, a rear surface of display screen 132 may be disposed adjacent to a support member 136. For example, as shown in FIG. 6, at least a portion of display screen 132 may be disposed between support member 136 and lens fixture 134. In some embodiments, display screen 132 may be disposed within a recessed portion of support member 136 such that display screen 132 is secured within support member 136 and/or between support member 136 and lens fixture 134. According to at least one example, support member 136 may form a chassis that holds and/or supports multiple components of head-mounted-display device 102, including display screen 132, lens fixture 134, electronic components 138, and/or various other components of head-mounted-display device 102. As will be described in greater detail below, support member 136 may be mounted to at least a portion of display housing 110, thereby securing each of the associated components within display housing 110. Support member 136 may include any suitable material, such as a rigid and/or lightweight material, including, for example, a rigid polymer and/or metal material (e.g., a magnesium alloy).

In certain embodiments, one or more electronic components, such as electronic components 138 may be disposed in display housing 110. For example, electronic components 138 may be located within housing cavity 130 near at least a portion of display screen 132 and/or front-facing portion 112 of display housing 110, as illustrated in FIG. 6. In at least one embodiment, electronic components 138 may be mounted to a portion of support member 136 between display screen 132 and front-facing portion 112 of display housing 110. In at least one example, electronic components 138 may include, at least in part, a printed circuit board assembly that is mounted to support member 136 and/or to at least a portion of display housing 110.

Electronic components 138 may include, for example, electronic components utilized in the operation of display screen 132 (e.g., processors, memory, power management devices, communication devices, accelerometers, mapping and/or tracking devices, wiring, etc.). Additionally or alternatively, electronic components 138 may perform various other functions, such as, for example, functions related to operations of head-mounted-display system 100. In some embodiments, one or more electronic components 138 may carry out functions related to audio subsystems 116 shown in FIG. 1, such as providing audio signals to and/or receiving audio signals from audio subsystems 116. Additionally or alternatively, one or more electronic components 138 may, for example, carry out functions related to 1) tracking the position and orientation of head-mounted-display device 102 and/or one or more controllers (e.g., hand-held controllers) held and operated by a user, 2) performing simultaneous localization and mapping (SLAM) of a user's local area, 3) communicating with one or more devices external to head-mounted-display device 102 (e.g., gaming and/or multimedia consoles or devices, desktops, laptops, tablets, cellular phones, smart phones, wearable devices, embedded systems, internet routers, other head-mounted-display devices, hand-held controllers, etc.), 4) monitoring and/or adjusting temperatures within at least a portion of head-mounted-display device 102, and/or 5) providing haptic feedback to a user.

Figure 7:
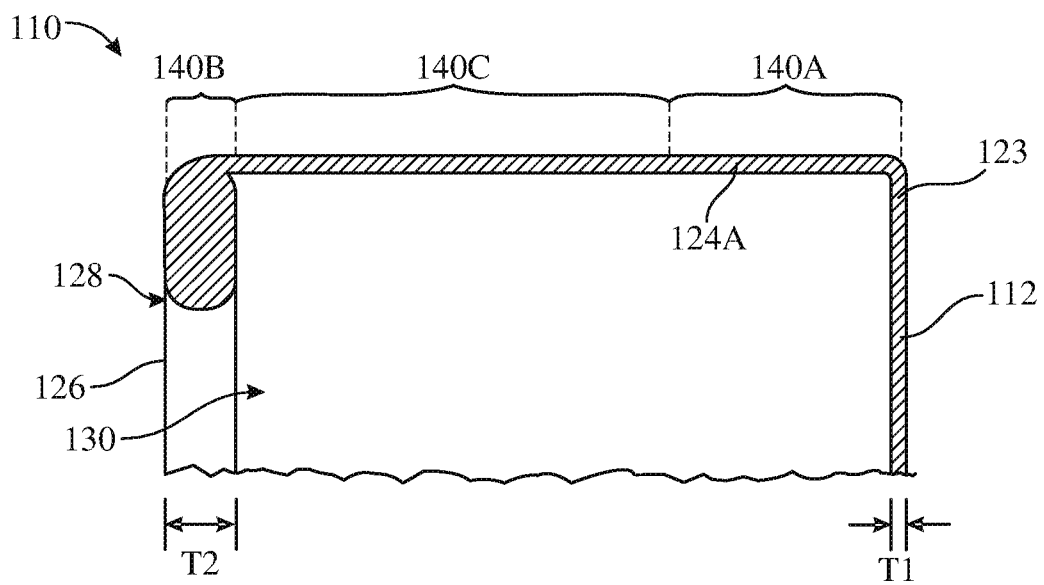
FIG. 7 is a cross-sectional side view of a portion of an exemplary display housing in accordance with some embodiments.

FIG. 7 illustrates a portion of display housing 110 according to at least one embodiment. Knitted layer 123 of display housing 110 may include various regions with different characteristics. For example, knitted layer 123 forming at least a portion of display housing 110 may include two or more regions that have different physical properties and/or degrees of one or more physical properties. Examples of physical properties that may vary between regions of knitted layer 123 forming display housing 110 may include, for example, rigidity, flexibility, elasticity, deformability, and/or bondability (e.g., bondability to at least one specified material). Additional examples of one or more physical properties that may vary between regions of knitted layer 123 may include, without limitation, malleability, hardness, density, ductility, plasticity, thermal and/or electrical conductivity, and/or any other suitable measurable and/or observable property. Various characteristics of different regions of knitted layer 123 forming display housing 110 may correspond to particular types of fibers and/or combinations of fibers present in the different regions. For example, fibers and/or combinations of fibers having desired physical properties may be used to form the various regions of knitted layer 123. In some embodiments, knitted layer 123 may be further subjected to processing to modify certain physical properties of one or more regions of knitted layer 123, as will be described in greater detail below.

The exemplary portion of display housing 110 illustrated in FIG. 7 may include a knitted layer 123 that includes at least a first region 140A and a second region 140B that differ from each other in one or more characteristics. In at least one embodiment, first region 140A of knitted layer 123 may include, for example, at least a portion of front-facing portion 112 and/or at least a portion of upper side portion 124A. In some examples, second region 140B, which is separate from first region 140A, may include at least a portion of facial-interface portion 126. First region 140A may have a first degree of at least one physical property and second region 140B may have a second degree of the at least one physical property. For example, first region 140A may have a higher rigidity and a lower flexibility than second region 140B. In this example, first region 140A may be well-suited for securely mounting and/or supporting components of head-mounted-display device 102 due to its higher rigidity. In contrast, the higher flexibility of second region 140B may facilitate fitting and adjustment of head-mounted-display device 102 to a user's face by enabling second region 140B to readily flex and conform the user's unique facial features.

According to some embodiments, knitted layer 123 forming display housing 110 may include a transition region between first region 140A and second region 140B having characteristics between those exhibited in first region 140A and second region 140B. For example, as shown in FIG. 7, display housing 110 may include a transition region 140C extending between first region 140A and second region 140B. In at least one example, transition region 140C may progressively change in degree of the at least one physical property proceeding from first region 140A toward second region 140B. For example, the rigidity of knitted layer 123 may decrease and the flexibility of knitted layer 123 may increase proceeding along transition region 140C in a direction away from first region 140A and toward second region 140B. The characteristics of knitted layer 123 in transition region 140C may vary in any suitable manner. For example, transition region 140C of knitted layer 123 may include a gradient of one or more physical properties (e.g., a rigidity gradient, a flexibility gradient, a bondability gradient, an elasticity gradient, etc.). Additionally or alternatively, transition region 140C of knitted layer 123 may include a plurality of sub-regions each having different degrees of one or more physical properties that incrementally increase or decrease in transition region 140C. While FIG. 7 illustrates first region 140A, second region 140B, and/or transition region 140C that include exemplary portions of knitted layer 123 forming display housing 110, first region 140A, second region 140B, and/or transition region 140C may additionally or alternatively include any other suitable portions of display housing 110, without limitation. In some embodiments, knitted layer 123 forming display housing 110 may also include one or more additional regions having any suitable characteristics, without limitation. In at least one example, selected regions of knitted layer 123 having different characteristics, such as, for example, first region 140A and second region 140B, may be disposed adjacent to each other with no transition region between the adjacent regions.

According to at least one embodiment, portions of knitted layer 123 of display housing 110 may vary in layer thickness. For example, as shown in FIG. 7, at least a portion of front-facing portion 112 in first region 140A may have a first layer thickness T1, while at least a portion of facial-interface portion 126 in second region 140B may have a second layer thickness T2 that is greater than first layer thickness T1. In some examples, the increased second layer thickness T2 of facial-interface portion 126 may provide additional cushioning and conformability for comfortably abutting and/or contacting a user's face. According to at least one embodiment the thickness of knitted layer 123 may be increased by changing the knitting technique and/or pattern used to form selected portions of knitted layer 123. For example, facial-interface portion 126 may be formed to have the increased second layer thickness T2 by knitting a spacer mesh into at least a portion of facial-interface portion 126. In some embodiments, knitted layer 123 may include a thickness transition region in which a thickness of knitted layer 123 progressively increases or decreases in thickness proceeding between a region having a first layer thickness (e.g., thickness T1) and a region having a second layer thickness (e.g., thickness T2).

Characteristics of various regions of knitted layer 123 forming display housing 110, such as physical properties of first region 140A, second region 140B, transition region 140C, and/or any other regions of knitted layer 123 of display housing 110, may be obtained by forming the various regions of knitted layer 123 using one or more specified types of fibers (e.g., filaments), combinations of fibers (e.g., yarns and/or threads that each include multiple fibers), and/or other material elements in each of the respective regions. Any suitable types of fibers, combinations of fibers, and/or other material elements may be utilized to form knitted layer 123, including, for example, fibers and/or other material elements including any suitable synthetic fiber materials and/or natural fiber materials. In some embodiments, first region 140A may include a greater proportion of a first type of fiber than second region 140B, and second region 140B may include a greater proportion of a second type of fiber than first region 140A. For example, first region 140A may include a proportion of about 50% or more (e.g., at least about 50%, about 55%, about 60%, about 65%, about 70%, about 75%, about 80%, about 85%, about 90%, about 95%, about 100%) of the first type of fiber. A remainder of first region 140A may include, for example, the second type of fiber and/or one or more other types of fibers and/or other materials incorporated into knitted layer 123. Second region 140B may include a proportion of about 50% or more (e.g., at least about 50%, about 55%, about 60%, about 65%, about 70%, about 75%, about 80%, about 85%, about 90%, about 95%, about 100%) of the second type of fiber. A remainder of second region 140B may include, for example, the first type of fiber and/or one or more other types of fibers and/or other materials incorporated into knitted layer 123.

According to various embodiments, transition region 140C may include a proportion of the first type of fiber and/or a proportion of the second type of fiber that is between the respective proportions of these types of fibers in first region 140A and second region 140B. For example, a proportion of the first type of fiber and/or a proportion of the second type of fiber in transition region 140C may progressively vary (e.g., increase and/or decrease) between first region 140A and second region 140B. A proportion of the first type of fiber in transition region 140C may, for example, incrementally decrease along a gradient proceeding away from first region 140A and toward second region 140B. Additionally or alternatively, a proportion of the second type of fiber in transition region 140C may incrementally increase along a gradient proceeding away from first region 140A and toward second region 140B. Selected proportions of various types of fibers and/or other materials incorporated into different regions of knitted layer 123 of display housing 110 may be produced in any suitable manner. For example, courses of at least one fiber and/or portions of such courses of at least one fiber forming different regions of knitted layer 123 may be patterned in any suitable manner to produce desired proportions of the various types of fibers (e.g., a region of knitted layer 123 having a 50% proportion of the first type of fiber and a 50% proportion of the second type of fiber may include alternating courses of the first type of fiber and the second type of fiber).

In some embodiments, various types of fibers, combinations of fibers, and/or other material elements incorporated into knitted layer 123 of display housing 110 may exhibit desired characteristics, such as desired physical properties (e.g., elasticity, flexibility, etc.) as described above, at the time the fibers are knitted together to form knitted layer 123. Additionally or alternatively, knitted layer 123 may be further processed following knitting to modify certain types fibers, combinations of fibers, and/or other material elements. For example, knitted layer 123 may be processed to melt and/or harden certain types of fibers, combinations of fibers, and/or other material elements in knitted layer 123. In at least one embodiment, for example, fibers, combinations of fibers, and/or other material elements including thermoplastic materials (e.g., fusible fibers, etc.), thermosetting materials, and/or curable materials (e.g., photopolymer fibers, etc.) may be incorporated into knitted layer 123. Fibers, combinations of fibers, and/or other material elements including such materials may melt into adjacent fibers and/or other regions of display housing 110 and or may harden during and/or following processing of at least a portion of knitted layer 123. Examples of suitable thermoplastic, thermosetting, curable, and/or other types of fibers and/or other materials incorporated into knitted layer 123 may include, without limitation, polyurethanes, polyether urethanes, polyester urethanes, polyethylenes, ethyl vinyl acetates, polypropylenes, polyesters, and/or silicones.

At least a portion of knitted layer 123 of display housing 110 may be processed in any suitable manner. For example, at least a portion of knitted layer 123 may be subjected to elevated heat and/or pressure sufficient to melt, soften, cure, mold, and/or otherwise modify one or more physical properties of one or more types of fibers, combinations of fibers, and/or other material elements in knitted layer 123. In some examples, at least a portion of knitted layer 123 may be exposed to light (e.g., UV light, visible light, etc.) and/or radiation (e.g., gamma radiation, electron beam (EB) radiation, microwave radiation, etc.) sufficient to effect curing of one or more types of fibers, combinations of fibers, and/or other material elements in knitted layer 123. Additionally or alternatively, at least a portion of knitted layer 123 may be exposed to one or more chemical agents to effect curing of one or more types of fibers, combinations of fibers, and/or other material elements in knitted layer 123. According to at least one embodiment, at least a portion of knitted layer 123 of display housing 110 may be molded and/or otherwise deformed during processing to obtain a desired shape. For example, at least a portion of knitted layer 123 may be disposed within a mold and/or may be disposed against a suitable forming member such that knitted layer 123 conforms to a desired shape during and/or following processing. In some examples, during or following processing, at least a portion of knitted layer 123 of display housing 110 may be coated with one or more additional materials (e.g., a polymer material).

Figure 8:
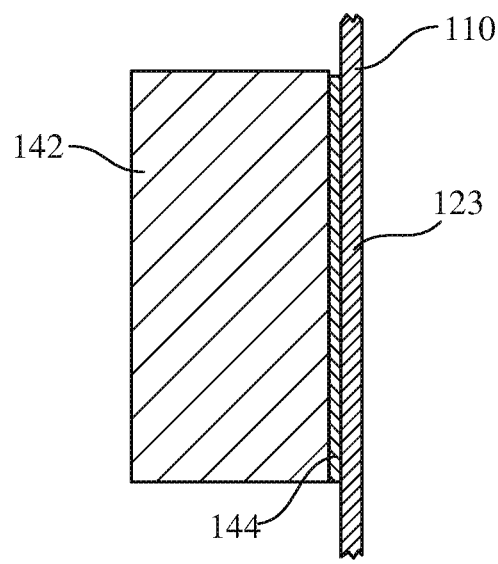
FIG. 8 is a cross-sectional side view of a head-mounted-display component mounted bonded to a portion of a knitted layer of an exemplary display housing in accordance with some embodiments.
Figure 9:
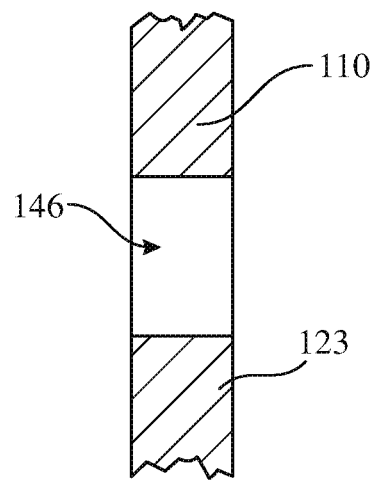
FIG. 9 is a cross-sectional side view of a portion of a knitted layer of an exemplary display housing in accordance with some embodiments.
Figure 10:
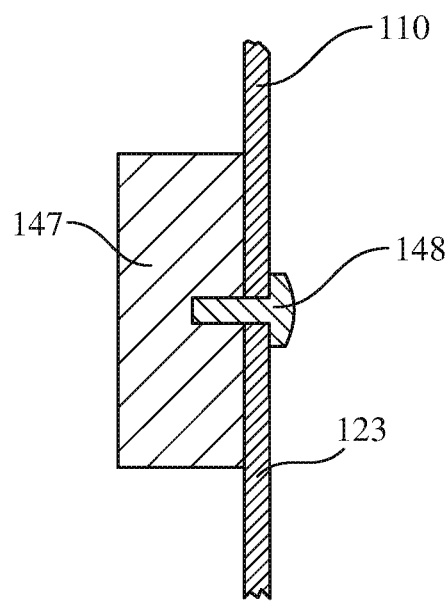
FIG. 10 is a cross-sectional side view of a head-mounted-display component mounted to a portion of a knitted layer of an exemplary display housing in accordance with some embodiments.

FIGS. 8-10 illustrate exemplary techniques for mounting components to at least a portion of knitted layer 123 of display housing 110. Components of head-mounted-display system 100 (e.g., electrical and/or electronic components, structural components, optical components, mechanical components, etc.) may be mounted to and/or incorporated within at least a portion of display housing 110 in any suitable manner. In at least one embodiment, as shown in FIG. 8, an exemplary mounted component 142 may be bonded to at least a portion of display housing 110. For example, mounted component 142 may be secured to at least a portion of knitted layer 123 of display housing 110 by a bonding layer 144. Mounted component 142 may be mounted to an internal surface and/or an external surface of display housing 110 in such a manner. Bonding layer 144 may include any suitable bonding agent, such as an adhesive material. In some examples, mounted component 142 may be bonded to multiple portions of display housing 110. For example, one surface portion of mounted component 142 may be bonded to front-facing portion 112 of display housing 110 and another surface portion of mounted component 142 may be bonded to a side portion of display housing 110 (e.g., upper side portion 124A, lower side portion 124B, right side portion 124C, and/or left side portion 124D shown in FIGS. 4-7).

In some embodiments, knitted layer 123 of display housing 110 may facilitate secure bonding of a component to display housing 110. For example, a bonding agent may infiltrate physical features of knitted layer 123, such as interstices defined between fiber loops and/or sections of knitted layer 123, to further secure the bonding agent to knitted layer 123 of display housing 110. In at least one embodiment, one or more selected fiber types included in at least a portion of knitted layer 123 of display housing 110 may have increased bondability with respect to one or more bonding agents, facilitating secure bonding of components to knitted layer 123. According to some embodiments, one or more components of head-mounted-display system 100 may be directly bonded to knitted layer 123. For example, a portion of knitted layer 123 and/or a portion of a component may be heated or chemically treated to soften or melt the portion of knitted layer 123 and/or the component. The portion of knitted layer 123 and/or the component portion may then be cooled, forming a bond between knitted layer 123 and the component.

According to some embodiments, one or more components of head-mounted-display system 100 may be mechanically secured to at least a portion of display housing 110. According to at least one example, as shown in FIG. 9, at least one hole 146 may be defined in at least a portion of display housing 110. Hole 146 may, for example, extend through a portion of display housing 110 in a thickness direction of display housing 110. Hole 146 may be defined in display housing 110 any suitable manner. For example, hole 146 may be formed in display housing 110 during knitting of knitted layer 123 of display housing 110. Hole 146 may, for example, be formed in knitted layer 123 according to a selected knitting pattern. In some embodiments, hole 146 may be formed in display housing 110 following formation of knitted layer 123 of display housing 110. For example, hole 146 may be formed by cutting (e.g., die cutting, punching, drilling, machining, etc.) and/or melting a corresponding portion of knitted layer 123 and/or through any other by any other suitable process. Hole 146 may be defined in any suitable portion of knitted layer 123 of display housing 110, without limitation. In some embodiments, hole 146 may be defined in a rigid or semi-rigid portion of knitted layer 123 (e.g., first region 140A and/or transition region 140C shown in FIG. 7), facilitating formation of hole 146 in knitted layer 123 and/or facilitating mounting of one or more components to knitted layer 123. In at least one example, a loop and/or any other suitable attachment feature extending from a surface portion of knitted layer 123 of display housing 110 may be formed during and/or following formation of knitted layer 123.

FIG. 10 illustrates an exemplary mounted component 147 that is mechanically secured to at least a portion of display housing 110. As shown in this figure, mounted component 147 may be disposed adjacent to and/or near hole 146 defined in a portion of knitted layer 123 of display housing 110 and may be mechanically secured to display housing 110 by a fastener 148 extending through hole 146. Hole 146 may be any suitable type of fastener (e.g., a screw, a bolt, a rivet, a pin, an anchor, a snap, a hook-and-loop fastener, etc.) and/or any other suitable type of mechanical device and/or member for securing a component to display housing 110. Mounted component 147 may be mounted to an internal surface and/or an external surface of display housing 110 in such a manner.

Figure 11:
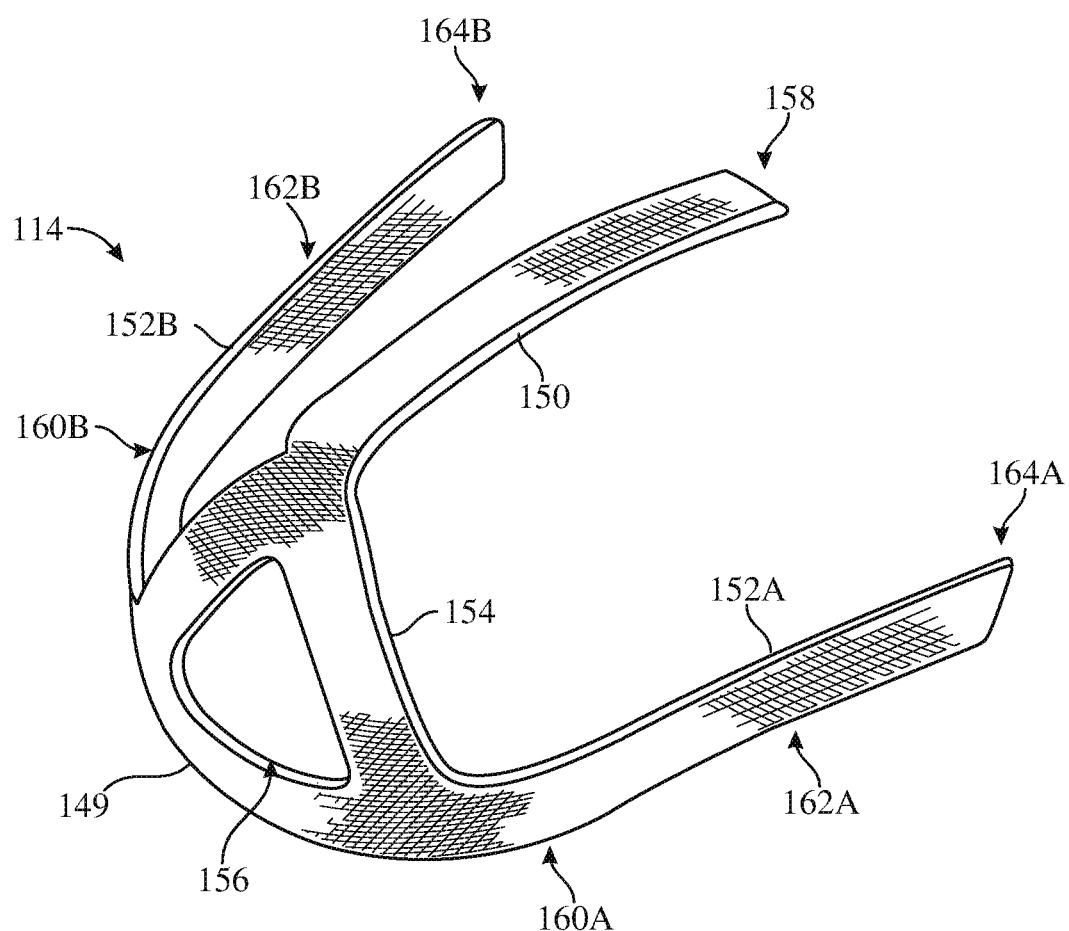
FIG. 11 is a perspective view of an exemplary strap subsystem in accordance with some embodiments.

FIG. 11 illustrates an exemplary strap subsystem 114 of a head-mounted-display system 100 according to various embodiments. Strap subsystem 114 may be partially or entirely formed of a knitted layer 149 formed by any suitable technique and/or combination of techniques (see, e.g., knitted layer 120 and/or knitted layer 220 illustrated in FIGS. 2 and 3). In some embodiments, strap subsystem 114 may be separate from display housing 110, as shown in FIGS. 1 and 11. Additionally or alternatively, at least a portion of strap subsystem 114 may be integrally formed (e.g., integrally knitted) with at least a portion of display housing 110.

Strap subsystem 114 may be used for adjustably mounting head-mounted-display device 102 (see, e.g., FIGS. 1 and 6) on a user's head. As shown in FIG. 11, strap subsystem 114 may include an upper strap 150, a right side strap 152A (corresponding to a right side of the user's head), a left side strap 152B (corresponding to a left side of the user's head), and a back piece 154. In some embodiments, knitted layer 149 may form at least a portion of upper strap 150, right side strap 152A, left side strap 152B, and/or back piece 154. According to at least one embodiment, upper strap 150, right side strap 152A, left side strap 152B, and/or back piece 154 may be integrally formed by knitted layer 149. Additionally or alternatively, upper strap 150, right side strap 152A, left side strap 152B, and/or back piece 154 may be formed by two or more connected and/or separate knitted layers. In some embodiments, back piece 154 may be positioned and dimensioned to rest against a back portion of the user's head. Upper strap 150, right side strap 152A, and left side strap 152B may be coupled to head-mounted-display device 102 in any suitable manner. For example, upper strap 150, right side strap 152A, and/or left side strap 152B may be bonded and/or mechanically fastened to head-mounted-display device 102. In some embodiments, back piece 154 may include a back-piece opening 156 that is dimensioned and positioned to securely fit around a back portion (e.g., a portion of the user's occipital lobe) of the user's head. Back piece 154 and back-piece opening 156 may each have a generally triangular shape, as shown in FIG. 11, and/or any other suitable shape.

Knitted layer 149 of strap subsystem 114 may include various regions with different characteristics to securely and comfortably mount head-mounted-display system 100 to a user's head and/or to allow for incorporation and/or attachment of various components to strap subsystem 114. For example, knitted layer 149 forming at least a portion of strap subsystem 114 may include two or more regions that have different physical properties and/or different degrees of one or more physical properties, including, for example, one or more of the physical properties discussed above in relation to FIG. 7. Various characteristics of different regions of knitted layer 149 forming strap subsystem 114 may correspond to particular types of fibers and/or combinations of fibers present in the different regions. For example, fibers and/or combinations of fibers having desired physical properties may be used to form the various regions of knitted layer 149. Additionally, proportions of fibers and/or combinations of fiber in different regions of knitted layer 149 of strap subsystem 114 may, for example, be selected to provide desired characteristics in each of the various regions. In some embodiments, knitted layer 149 may be further subjected to processing to modify characteristics, such as physical properties, of the different regions as discussed in greater detail above with respect to FIG. 7.

According to at least one embodiment, knitted layer 149 of strap subsystem 114 may include various flexible, semi-rigid, and/or rigid sections, enabling strap subsystem 114 to adjustably and securely conform to various portions of a user's head when the user is wearing head-mounted-display system 100. In some embodiments, right side strap 152A and left side strap 152B may each include at least a portion of knitted layer 149 having a selected combination flexible, semi-rigid, and/or rigid regions. For example, as illustrated in FIG. 11, right side strap 152A and left side strap 152B may respectively include semi-rigid sections 160A and 160B, rigid sections 162A and 162B, and flexible sections 164A and 164B formed by at least a portion of one or more knitted layers. Semi-rigid sections 160A and 160B of right side strap 152A and left side strap 152B may, for example, allow for conformity of right side strap 152A and left side strap 152B around rear and side portions of a user's head while providing sufficient support to maintain right side strap 152A and left side strap 152B respectively in position above the user's left and right ears. Rigid sections 162A and 162B of right side strap 152A and left side strap 152B may respectively extend between right side strap 152A and left side strap 152B and head-mounted-display device 102 (see, e.g., FIG. 1) to, for example, securely support head-mounted-display device 102 in a desired position on the user's head. In some examples, rigid sections 162A and 162B may also provide support for one or more components of head-mounted-display system 100, such as portions of audio subsystems 116 shown in FIG. 1.

According to some examples, flexible sections 164A and 164B of right side strap 152A and left side strap 152B may be respectively located at and/or near end portions of right side strap 152A and left side strap 152B. Flexible sections 164A and 164B of right side strap 152A and left side strap 152B may utilized for respectively coupling right side strap 152A and left side strap 152B to head-mounted-display device 102 of head-mounted-display system 100. Flexible sections 164A and 164B of right side strap 152A and left side strap 152B may also allow for adjustment of strap subsystem 114 with respect to head-mounted-display device 102 in accordance with a user's particular head shape. In some examples, at least a portion of flexible sections 164A and 164B of right side strap 152A and left side strap 152B may have a selected degree of elasticity to allow for comfortably adjusting head-mounted-display system 100 to fit the user's head. In at least one embodiment, upper strap 150 may include a flexible and/or semi-rigid portion of knitted layer 149 of strap subsystem 114, allowing upper strap 150 to readily conform and/or adjust to an upper portion of a user's head. Upper strap 150 may be coupled to head-mounted-display device 102 at, for example, a flexible end section 158 of upper strap 150 and may be adjusted to securely fit head-mounted-display system 100 to the user's head. In at least one example, back piece 154 may include a semi-rigid and/or rigid portion of knitted layer 149 of strap subsystem 114, providing a supportive region abutting a rear portion of the user's head. Knitted layer 149 of strap subsystem 114 may additionally or alternatively include any other suitable characteristics and/or combinations of characteristics in any suitable portion of strap subsystem 114, without limitation.

According to some embodiments, knitted layer 149 forming at least a portion of strap subsystem 114 may include one or more transition regions between various portions of strap subsystem 114 (see, e.g., transition region 140C in FIG. 7). Such transition regions may, for example, have characteristics between those exhibited in the various portion of strap subsystem 114. For example, a transition region extending between a flexible region and a semi-rigid region and/or a rigid region may include a gradient that progressively increases in rigidity proceeding from the flexible region toward the semi-rigid region and/or the rigid region. In at least one example, selected regions of knitted layer 149 having different characteristics may be disposed adjacent to each other with no transition region between the adjacent regions. According to some embodiments, portions of knitted layer 149 of strap subsystem 114 may vary in layer thickness. For example, strap subsystem 114 may include relatively thinner regions to provide greater flexibility and/or to reduce the profile of strap subsystem 114 in these regions. Additionally or alternatively, strap subsystem 114 may include relatively thicker regions to, for example, provide additional structural support and/or cushioning.

According to various embodiments, at least a portion of knitted layer 149 of strap subsystem 114 may be processed in any suitable manner. For example, at least a portion of knitted layer 149 may be subjected to elevated heat and/or pressure sufficient to melt, soften, cure, mold, and/or otherwise modify one or more physical properties of one or more types of fibers, combinations of fibers, and/or other material elements in at least a portion of the knitted layer, as described above in relation to FIG. 7. In some embodiments, one or more components of head-mounted-display system 100 (e.g., electrical and/or electronic components, structural components, optical components, mechanical components, etc.) may be coupled to at least a portion of strap subsystem 114 in any suitable manner. For example, various components may be mounted to and/or incorporated within at least a portion of strap subsystem 114 by bonding and/or mechanically fastening the components to knitted layer 149 of strap subsystem 114 in any suitable manner as described above in relation to FIGS. 8-10. In certain embodiments, one or more holes, loops, and/or other suitable features may be defined and/or formed in knitted layer 149 of strap subsystem 114 in any suitable manner (See, e.g., FIG. 9).

Figure 12:
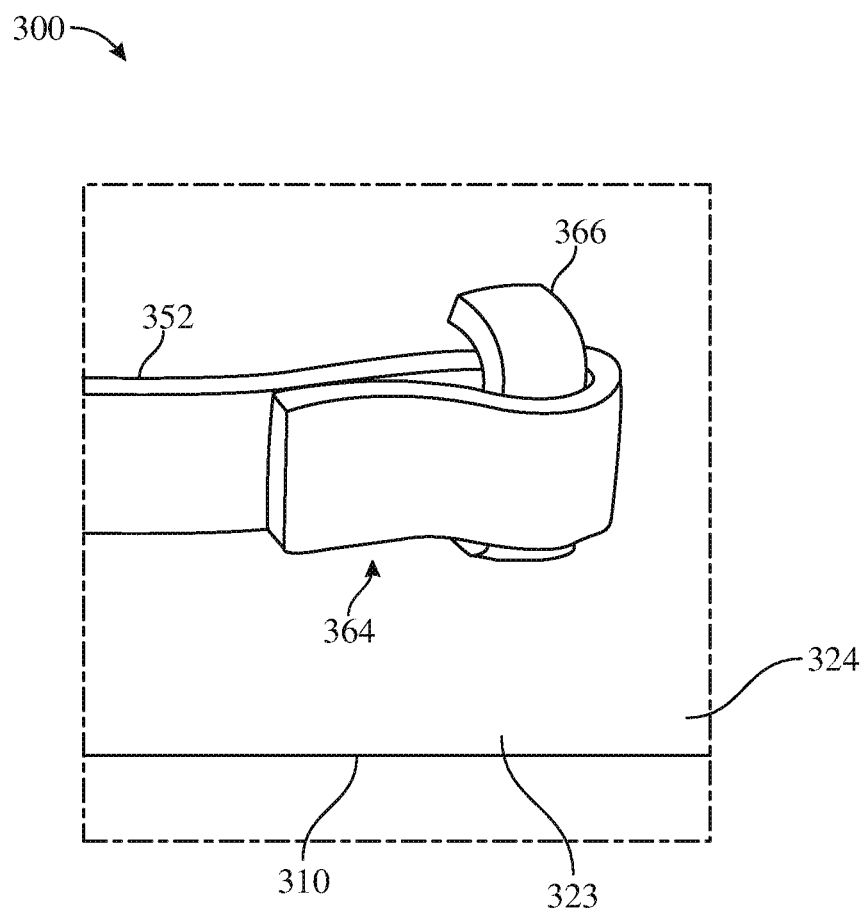
FIG. 12 is a perspective view of a portion of an exemplary strap subsystem coupled to a portion of an exemplary display housing in accordance with some embodiments.

FIG. 12 illustrates a portion of a strap subsystem that is coupled to a portion of an exemplary display housing according to some embodiments. A strap system of a headmental-display system may be coupled to a corresponding display housing in any suitable manner. For example, one or more portions of strap subsystem 114 may be coupled to display housing 110 of head-mounted-display device 102 by an attachment member that is mounted to display housing 110 and/or any other suitable portion of head-mounted-display device 102 (see, e.g., FIG. 1). Additionally or alternatively, one or more portions of strap subsystem 114 may be bonded to, mechanically fastened to, and/or integrally formed with display housing 110 and/or any other suitable portion of head-mounted-display device 102.

According to some embodiments, at least a portion of a strap subsystem, such as a portion of exemplary side strap 352 shown in FIG. 12, may be coupled to a suitable feature formed by and/or defined in or on a portion of a knitted layer 323 of an exemplary display housing 310 of a head-mounted-display system 300. For example, an end section 364 of side strap 352 may be coupled to a mounting loop 366 formed by a portion of display housing 310, such as side portion 324 illustrated in FIG. 12. Mounting loop 366 may be formed by knitted layer 323 of display housing 310 in any suitable manner. For example, mounting loop 366 may be formed in knitted layer 323 of display housing 310 according to a selected knitting pattern during knitting of knitted layer 323. In some embodiments, mounting loop 366 may be produced in knitted layer 323 of display housing 310 following formation of knitted layer 323 by cutting, melting, and/or molding a portion of the knitted layer and/or by any other suitable process. In at least one embodiment, at least a portion of end section 364 of side strap 352 may extend through a mounting loop 366 to couple side strap 352 to display housing 310. For example, as shown in FIG. 12, end section 364 may pass through mounting loop 366 and may be mechanically secured (e.g., by hook-and-loop fastening, hook-and-pile fastening, touch fastening, etc.) and/or bonded to another portion of side strap 352 in any suitable manner.

Figure 13:
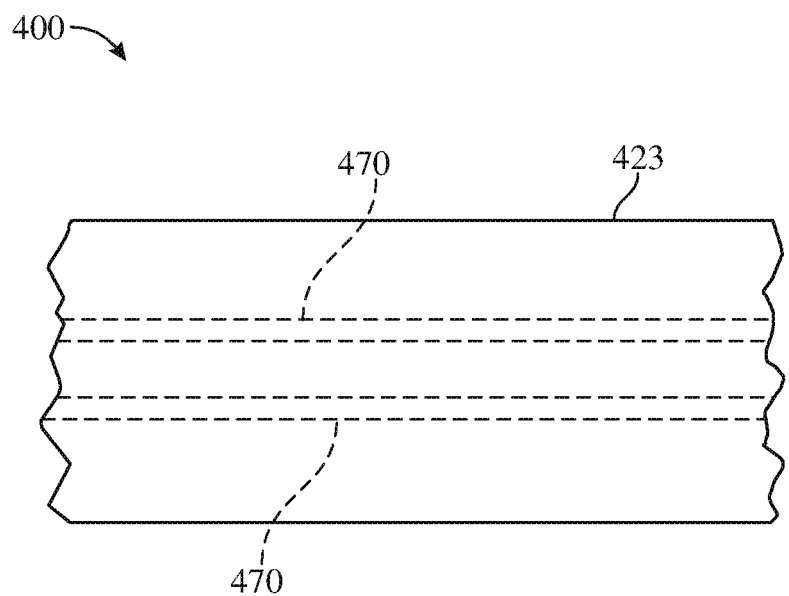
FIG. 13 is a side view of a portion of a knitted layer of an exemplary head-mounted-display system that includes wiring disposed within the knitted layer in accordance with some embodiments.
Figure 14:
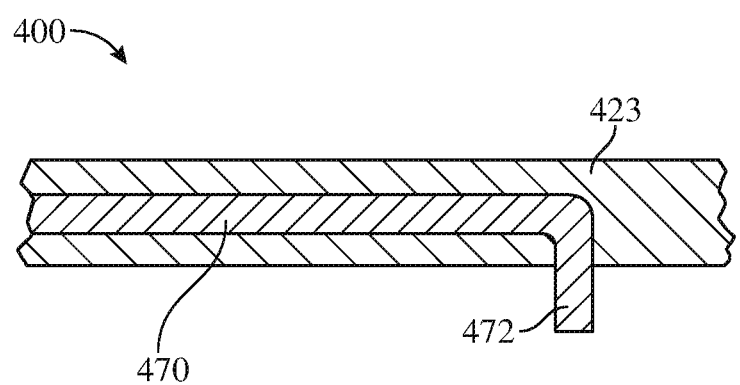
FIG. 14 is a cross-sectional view of a portion of an exemplary head-mounted-display system that includes wiring disposed within the knitted layer in accordance with some embodiments.

FIGS. 13 and 14 illustrate exemplary components that may be incorporated into an exemplary knitted layer 423 of a head-mounted-display system 400. Knitted layer 423 may form at least a portion of a display housing (e.g., display housing 110 shown in FIGS. 1 and 4-10) or a portion of strap subsystem (e.g., strap subsystem 114 shown in FIGS. 1 and 11) as described herein. In some embodiments, at least a portion of one or more components of head-mounted-display system 400 (e.g., electrical and/or electronic components, structural components, mechanical components, etc.) may be incorporated into at least a portion of knitted layer 423. For example, as shown in FIGS. 13 and 14, wiring 470 for conducting electrical current, light, and/or other suitable signals between various electronic components of head-mounted-display system 400 may be disposed within knitted layer 423. Wiring 470 may be, for example, a sheathed or unsheathed conductive wire or cable (e.g., a copper wire, etc.) or an optical fiber cable. Wiring 470 may be incorporated within knitted layer 423 in any suitable manner. For example, wiring 470 may be knitted into knitted layer 423 during formation of knitted layer 423 such that wiring 470 is enveloped by fiber portions of knitted layer 423. According to at least one embodiment, one or more portions of wiring 470 may protrude from any surface portion of knitted layer 423. For example, as illustrated in FIG. 14, a terminal 472 of wiring 470 may protrude from a surface portion of knitted layer 423, allowing for connection of wiring 470 to an electronic component of head-mounted-display system 400. Any other suitable components of head-mounted-display system 400 may be incorporated within at least a portion of knitted layer 423, without limitation.

Figure 15:
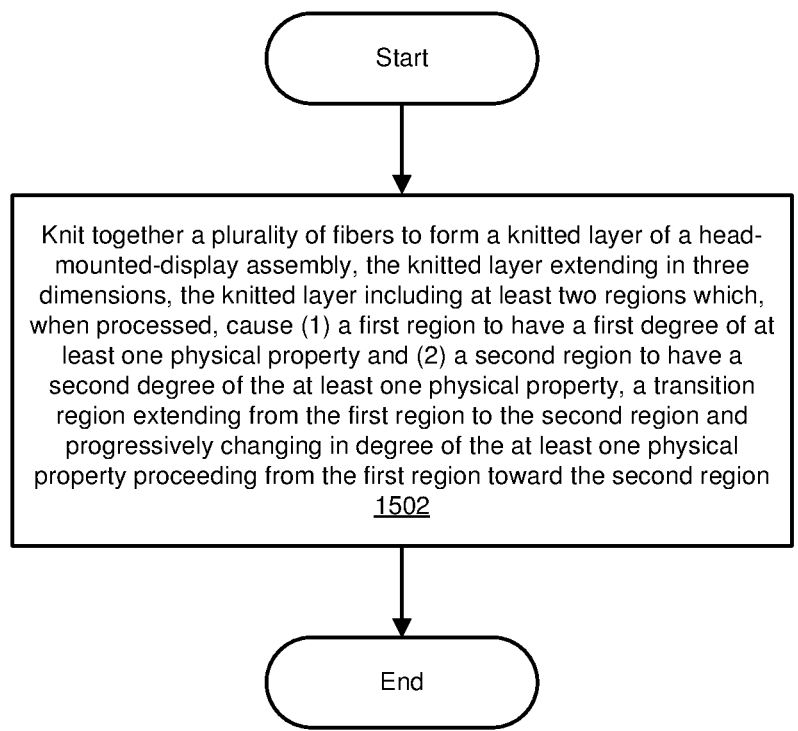
FIG. 15 is a flow diagram of an exemplary method for forming a knitted layer of a head-mounted-display system in accordance with some embodiments.

FIG. 15 is a flow diagram of an exemplary method 1500 for manufacturing a head-mounted-display assembly according to any of the embodiments disclosed herein. Steps shown in FIG. 15 may be performed by an individual and/or by any suitable manual and/or automated apparatus.

As illustrated in FIG. 15, at step 1502, a plurality of fibers may be knit together to form a knitted layer of a head-mounted-display assembly, the knitted layer extending in three dimensions. For example, a plurality of fibers and/or combinations of fibers may be knit together to form a knitted layer 123 of a display housing 110 and/or a knitted layer 149 of a strap subassembly 114 of a head-mounted-display system 100. (See, e.g., FIGS. 1-7 and 11). Knitted layer 123 may extend in three dimensions and may include, for example, at least a portion of front-facing portion 112, upper side portion 124A, lower side portion 124B, right side portion 124C, left side portion 124D, and/or facial-interface portion 126 of display housing 110. (See, e.g., FIGS. 4-7). Additionally or alternatively, knitted layer 149 may extend in three dimensions and may include, for example, at least a portion of upper strap 150, right side strap 152A, left side strap 152B, and/or back piece 154 of strap subsystem 114 (see, e.g., FIG. 11).

The knitted layer may include at least two regions, which, when processed, cause (1) a first region to have a first degree of at least one physical property and (2) a second region to have a second degree of the at least one physical property. A transition region may extend from the first region to the second region and may progressively change in degree of the at least one physical property proceeding from the first region toward the second region. For example, knitted layer 123 of a display housing 110 and/or a knitted layer 149 of a strap subassembly 114 may include at least two regions, which, when processed, cause (1) a first region 140A to have a first degree of at least one physical property and (2) a second region 140B to have a second degree of the at least one physical property, and a transition region 140C may extend from the first region to the second region (see, e.g., FIG. 7; see also FIG. 11). Transition region 140C may progressively change in degree of the at least one physical property proceeding from the first region toward the second region.

In some embodiments, during processing, at least a portion of the knitted layer may be exposed to at least one of elevated heat, elevated pressure, light, radiation, or at least one chemical agent sufficient to modify the at least one physical property of at least the portion of the knitted layer. Additionally or alternatively, during processing, at least a portion of the knitted layer may be softened, melted, cured, and/or molded. For example, knitted layer 123 and/or knitted layer 149 may be exposed to elevated heat, elevated pressure, light, radiation, and/or at least one chemical agent sufficient to modify the at least one physical property (e.g., rigidity, flexibility, elasticity, deformability, malleability, hardness, density, ductility, plasticity, thermal and/or electrical conductivity, and/or bondability to at least one specified material) of at least a portion of knitted layer 123 and/or knitted layer 149. In some examples, at least a portion knitted layer 123 and/or knitted layer 149 may be processed to soften, melt, cure, and/or mold at least a portion of knitted layer 123 and/or knitted layer 149 (see, e.g., FIGS. 7 and 11).

According to at least one embodiment, the first region of the processed knitted layer may be configured to have at least one head-mounted-display component mounted thereto. The at least one head-mounted-display component may be mounted to the first region of the processed knitted layer by bonding and/or mechanically fastening the at least one head-mounted-display component to the first region of the processed knitted layer. For example, at least one head-mounted-display component 142 and/or 147 may be mounted by bonding and/or mechanical fastening to first region 140A of the processed knitted layer (see, e.g., FIGS. 6-10; see also FIGS. 11-14).

As discussed throughout the instant disclosure, the disclosed apparatuses, assemblies, systems, and methods may include three-dimensional knitted layers that provide one or more advantages over traditional display apparatuses, assemblies, systems, and methods. Such knitted layers may allow for head-mounted-display systems to be constructed with greater customizability and freedom of design. Different portions of a knitted layer may have distinct characteristics, enabling parts of a head-mounted-display system that are conventionally assembled from multiple pieces to be formed from a single seamless piece. The knitted layers may allow for an increased range of physical properties to be included in various regions of the head-mounted-display systems. For example, a display housing and/or a strap subsystem may be formed from a continuous knitted layer having various rigid sections, semi-rigid sections, flexible sections, and/or elastic sections, eliminating the need for assembling separate pieces having these respective characteristics. Such continuous knitted layers may have structurally supportive regions as well as adaptive regions that conform to a user's unique head and facial features, increasing a user's comfort level while wearing the head-mounted-display system. The knitted layers may also reduce the weight of head-mounted-display systems along with reductions in raw material requirements, assembly time, and production costs. Additionally, the aesthetic appeal of head-mounted-display systems incorporating seamless knitted layers may be improved through the elimination of bulky components and/or visible junctions between various components of the systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Where a range of values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

Unless otherwise noted, the terms "connected to," "coupled to," and "attached to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising." It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Furthermore, two or more elements may be coupled together with an adhesive, a clasp, a latch, a hook, a link, a buckle, a bolt, a screw, a rivet, a snap, a catch, a lock, and/or any other type of fastening or connecting mechanism.

What is claimed is:

1. A head-mounted-display assembly comprising:
a knitted layer formed of a plurality of fibers and extending in three dimensions to define a housing cavity, the knitted layer comprising:
a first region having a first degree of at least one physical property corresponding to a first proportion of a first type of fiber included within the first region;
a second region having a second degree of the at least one physical property corresponding to a second proportion of the first type of fiber included within the second region; and
a transition region extending between the first region and the second region, wherein the transition region of the knitted layer progressively changes in degree of the at least one physical property proceeding from the first region toward the second region; and
at least one electronic head-mounted-display component secured within the housing cavity,
wherein:
the knitted layer comprises a seamless piece extending through each of the first region, the transition region, and the second region; and
the first region has a first average layer thickness and the second region has a second average layer thickness that differs from the first average layer thickness.

2. The head-mounted-display assembly of claim 1, wherein the at least one physical property comprises at least one of rigidity, elasticity, flexibility, deformability, or bondability to at least one specified material.

3. The head-mounted-display assembly of claim 1, wherein the plurality of fibers comprises a plurality of yarns, each of the plurality of yarns comprising multiple fibers.

4. The head-mounted-display assembly of claim 1, wherein the knitted layer comprises at least a portion of a display housing for mounting the at least one electronic head-mounted-display component.

5. The head-mounted-display assembly of claim 4, wherein:
the knitted layer comprises at least a portion of at least one of a front-facing portion or a side portion of the display housing; and
the side portion of the display housing extends from the front-facing portion toward a viewing opening dimensioned to surround at least a portion of a user's face.

6. The head-mounted-display assembly of claim 4, wherein:
the first region of the knitted layer comprises a mounting region for mounting the at least one electronic head-mounted-display component; and
the first region of the knitted layer has a higher degree of rigidity than the second region of the knitted layer.

7. The head-mounted-display assembly of claim 1, wherein the knitted layer comprises at least a portion of a strap subsystem dimensioned to extend around at least a portion of a user's head.

8. The head-mounted-display assembly of claim 1, wherein:
the plurality of fibers comprises the first type of fiber and a second type of fiber that comprises a different material than the first type of fiber; and
at least one of the first type of fiber and the second type of fiber comprises at least one of a thermoplastic material, a thermosetting material, or a curable material.

9. The head-mounted-display assembly of claim 8, wherein:
the first region of the knitted layer comprises a first proportion of the first type of fiber to the second type of fiber; and
the second region of the knitted layer comprises a second proportion of the first type of fiber to the second type of fiber, wherein the second proportion differs from the first proportion.

10. The head-mounted-display assembly of claim 1, wherein at least a portion of an electrical circuit is disposed in the knitted layer.

11. The head-mounted-display assembly of claim 1, wherein the at least one electronic head-mounted-display component is mounted to the first region of the knitted layer.

12. The head-mounted-display system of claim 1, wherein:
the at least one electronic component is mounted to the first region of the knitted layer by at least one of bonding or mechanical fastening; and
the first region of the knitted layer has a higher degree of rigidity than the second region of the knitted layer.

13. The head-mounted-display assembly of claim 1, wherein:
the at least one physical property includes rigidity and the first region of the knitted layer has a higher degree of rigidity than the second region of the knitted layer; and
the at least one electronic head-mounted-display component includes at least one display screen and at least one lens for viewing the at least one display screen secured within the housing cavity via mounting to the first region.

14. The head-mounted-display assembly of claim 13, wherein the second region of the knitted layer surrounds a viewing opening dimensioned to extend around a portion of a viewer's face to provide a view by the user of the at least one display screen via the at least one lens.

15. A method comprising:
knitting together a plurality of fibers to form a knitted layer of a head-mounted-display assembly, the knitted layer extending in three dimensions to define a housing cavity;
processing the knitted layer to produce:
a first region of the knitted layer having a first degree of at least one physical property corresponding to a first proportion of a first type of fiber included within the first region; and a second region of the knitted layer having a second degree of the at least one physical property corresponding to a second proportion of the first type of fiber included within the second region, wherein the first region has a first average layer thickness and the second region has a second average layer thickness that differs from the first average layer thickness; and a transition region of the knitted layer extending from the first region to the second region, wherein the transition region progressively changes in degree of the at least one physical property proceeding from the first region toward the second region, wherein the knitted layer comprises a seamless piece extending through each of the first region, the transition region, and the second region; and securing at least one electronic head-mounted-display component within the housing cavity.

16. The method of claim 15, wherein, during the processing, at least a portion of the knitted layer is exposed to at least one of elevated heat, elevated pressure, light, radiation, or at least one chemical agent sufficient to modify the at least one physical property of at least the portion of the knitted layer.

17. The method of claim 15, wherein, during the processing, at least a portion of the knitted layer is at least one of softened, melted, cured, or molded.

18. The method of claim 15, the first region of the processed knitted layer is configured to have the at least one head-mounted-display component mounted thereto, wherein the at least one head-mounted-display component is mounted to the first region of the processed knitted layer by at least one of bonding or mechanically fastening the at least one head-mounted-display component to the first region of the processed knitted layer.

19. The method of claim 15, wherein:

the first region of the knitted layer comprises a first proportion of the first type of fiber to a second type of fiber; and the second region of the knitted layer comprises a second proportion of the first type of fiber to the second type of fiber, wherein the second proportion differs from the first proportion.

* * * * *